United States Patent [19]

Hartley et al.

[11] Patent Number: 5,325,198

[45] Date of Patent: Jun. 28, 1994

[54] UNITARY TRANSFORM METHODS OF IDENTIFYING DEFECTS IN IMAGING DEVICES

[75] Inventors: Richard I. Hartley; Aiman A. Abdel-Malek, both of Schenectady; A. Nadeem Ishaque, Clifton Park, all of N.Y.

[73] Assignee: General Electric Company, Schenectady, N.Y.

[21] Appl. No.: 40,959

[22] Filed: Mar. 31, 1993

[51] Int. Cl.$^5$ ............................................. H04N 17/00
[52] U.S. Cl. ................................................... 348/180
[58] Field of Search .................... 358/139, 10, 111, 37, 358/166; 378/207, 99; 382/43; H04N 17/00, 17/02

[56] References Cited

U.S. PATENT DOCUMENTS 5,221,967  6/1993  Ward et al. .................... 358/139

OTHER PUBLICATIONS

"The Annealing Algorithm" by R. H. J. M. Otten and L. P. P. P. van Ginneken, published by Kluwer Academic Publishers, Boston, 1989 pp. 1-20.

"Fundamentals of Digital Image Processing" by Anil K. Jain, Prentice-Hall, (1989) pp. 132-188.

*Primary Examiner*—Victor R. Kostak
*Assistant Examiner*—Nathan J. Flynn
*Attorney, Agent, or Firm*—Lawrence P. Zale; Marvin Snyder

[57] ABSTRACT

An automated system for determining artifacts in images indicating defects in an imaging device being tested employs a constant radiation source which supplies radiation of spatially uniform intensity to the imaging device to be tested. The imaging device then creates a flood image $A^{(0)}$. A region of interest (ROI) mask unit for all pixel values of flood image $A^{(0)}$ sets values to zero outside of the imaging devices field of view to produce a flood image $A^{(1)}$. An image normalization unit normalizes flood image $A^{(1)}$ to have an average value of zero producing a normalized flood image A. A unitary transform unit performs a unitary transformation of normalized flood image A to produce an transform field which is then masked to select portions of the transform field. The squared magnitudes of the transform values of the selected regions are summed and the resulting sum is normalized for mask shape and flood image intensity to determine and quantify the presence of specific artifacts. The normalized summed value may be compared to a predetermined threshold to determine if the artifacts have a magnitude above an acceptable level. Based upon the results of the comparison, a corrective action may be taken such as removing the imaging device from a manufacturing line or adjusting the imaging device and retesting it.

7 Claims, 13 Drawing Sheets

UNITARY TRANSFORM METHODS OF IDENTIFYING DEFECTS IN IMAGING DEVICES

CROSS REFERENCES TO RELATED APPLICATIONS

This application is related to U.S. patent application "Correlation Methods of Identifying Defects In Imaging Devices" by Richard I. Hartley, Aiman A. Abdel-Malek and A. Nadeem Ishaque Ser. No. 08/037,191 filed on Mar. 25, 1993 assigned to the present assignee, hereby incorporated by reference.

BACKGROUND OF THE INVENTION

1. Field of the Invention

This invention relates to a system for testing imaging devices and more specifically to a system, using unitary transformation techniques for determining defects in imaging devices.

2. Description of Related Art

Because artifacts in an image distort the image, it has become necessary to identify imaging devices that produce artifacts in the manufacturing, or the calibration and even use of imaging devices. These artifacts may be difficult to identify visually and more difficult to identify visually when superimposed upon an image. If the artifacts are not corrected in images, they may be perceived as actual structures in the image. This may be the case in medical imaging where defects in the imaging device might be perceived as tissue differences in a patient, possibly leading to disastrous results. These imaging devices may be medical imaging systems such as Gamma Cameras used in imaging radioactive tracers introduced into a patient's body, X-ray imaging devices, and magnetic resonance (AM) imaging systems.

Prior art methods of detecting defects in Gamma Cameras, for example, are determined by an operator visually examining artifacts in an image produced by a Gamma Camera stimulated by a constant intensity gamma radiation source. This results in a very subjective test that varies greatly from camera to camera.

In Gamma cameras, for example, artifacts may appear as:

1) tubular or hexagonal "hex" patterns showing a distinct evenly spaced dark and light patterns;
2) secondary tube or "hex" patterns, which are differently sized evenly spaced dark and light circular or hexagonal patterns;
3) tramlines, which appear as lines through the image;
4) non-functional tubes, which appear as one or more dark or light regions having little relation to each other
5) bright or dark regions near the edges of the image; and
6) general blotches throughout the image.

Currently, there is a need for a reliable and accurate system to detect and quantify artifacts indicating defects in imaging devices, and adjust the devices to reduce or eliminate the artifacts.

SUMMARY OF THE INVENTION

An automated system for identifying defects in an imaging device employs a uniform energy source for providing energy of spatially uniform intensity to the imaging device allowing the device to create a D-dimensional flood image having a plurality of intensity values over a region of interest (ROI) and also having a background region.

A region-of-interest (ROI) mask unit sets intensity values of the background region of the flood image to zero.

An image normalization unit calculates a mean intensity over the ROI and subtracts the mean intensity from each intensity value within the ROI thereby resulting in normalized intensity values having an average mean intensity of zero over the ROI.

A unitary transform unit receives the normalized intensity values and determines a D-dimensional transform field comprised of transform values $T(A)_{i,j}$ each being an i,jth component of the unitary transform.

A test mask unit selects a test mask, which blocks out non-desired regions of the transform field and selects desired regions of the transform field. The squares of the magnitudes of the transform values of the selected regions are summed by a deviation calculation means, resulting in a summed transformation power.

A mask/exposure compensation means normalizes the summed transformation power according to the exposure of the flood image.

A decision unit compares the normalized transformation sum to a predetermined maximum threshold, and optionally activates a display means, which indicates if the threshold has been exceeded indicating that the imaging means has a significant artifact of the type being tested and has failed the test. The result of the test may be used to control adjustment equipment, which may adjust the imaging device and retest it, or activate machinery that may remove the defective imaging device from a manufacturing assembly line.

OBJECTS OF THE INVENTION

It is an object of the present invention to detect defects in images by an automated process having increased reliability and accuracy as compared with existing systems.

It is another object of the invention to detect and quantify different types of artifacts in images by an automated process having increased reliability and accuracy as compared with existing systems.

It is another object of the present invention to detect defects in imaging devices and iteratively adjust and test the imaging device until a predetermined level of quality is achieved.

BRIEF DESCRIPTION OF THE DRAWINGS

The features of the invention believed to be novel are set forth with particularity in the appended claims. The invention itself, however, both as to organization and method of operation, together with further objects, may best be understood by reference to the following description taken in conjunction with the accompanying drawing in which:

FIG. 2b is a transform field for the flood image of FIG. 2a.

FIG. 3b is a transform field for the flood image of FIG. 3a.

FIG. 4b is a transform field for the flood image of FIG. 4a.

FIG. 5b is a transform field for the flood image of FIG. 5a.

FIG. 6b is a transform field for the flood image of FIG. 6a.

FIG. 7b is a transform field for the flood image of FIG. 7a.

FIG. 8b is a transform field for the flood image of FIG. 8a.

FIG. 9b is a transform field for the flood image of FIG. 9a.

DETAILED DESCRIPTION OF THE INVENTION

Figure 1:
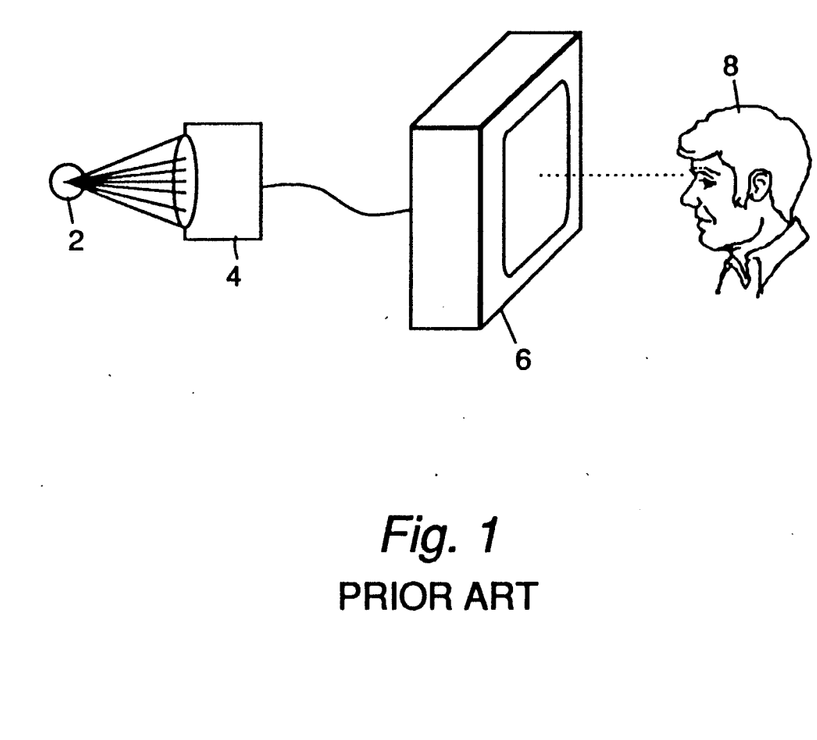
FIG. 1 is a block diagram of prior art system for detecting artifacts in an image created by an imaging system.

FIG. 1 illustrates a prior art setup for determining artifacts in images. A source 2 emits spatially constant radiation which is detected by an imaging device 4. Imaging device 4 constructs a flood image, A(0) having individual intensity values, or pixels which should theoretically have constant intensity over the image except for noise. The flood image is displayed on a monitor 6. An operator 8 examines the flood image on the display to determine if the imaging device should be adjusted, or in the case of manufacturing, be rejected to be remanufactured. The aging device is then adjusted or remanufactured and tested again. This process is very time consuming, may become very subjective and may depend upon the fatigue level of the operator.

Figure 2A:
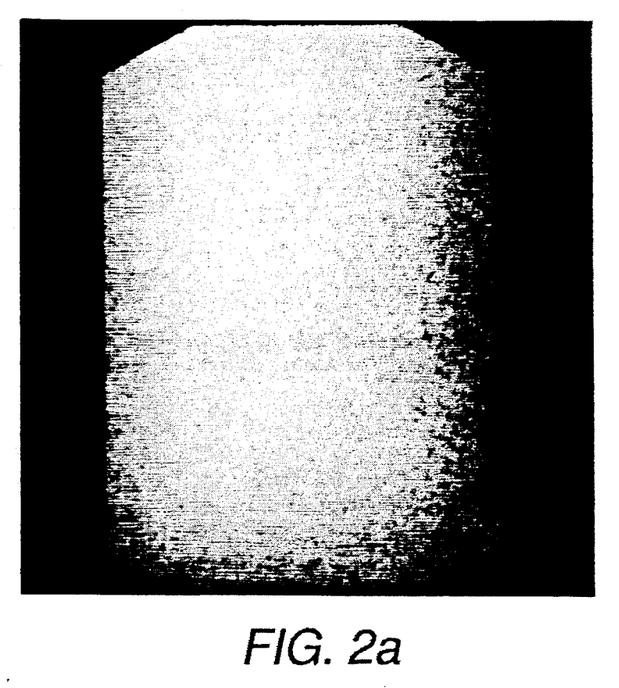
FIG. 2a is a flood image of a spatially constant source having no artifacts except for random noise.
Figure 2B:
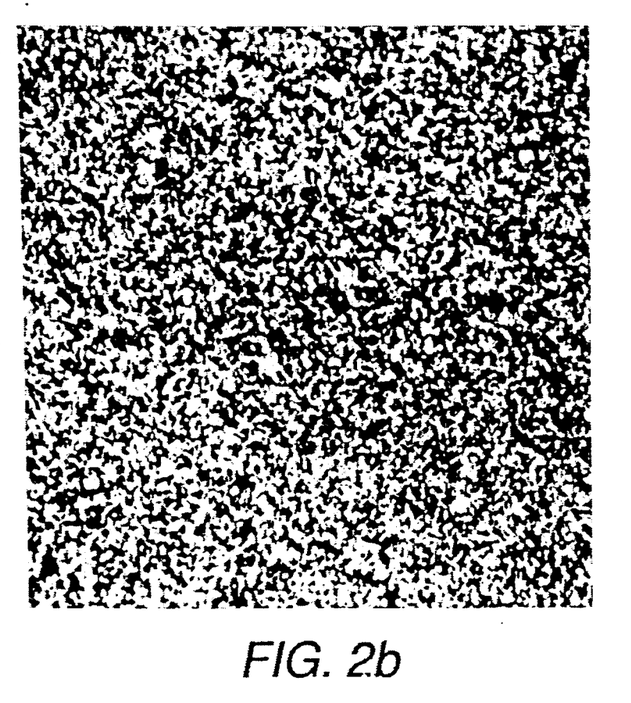
Figure 3A:
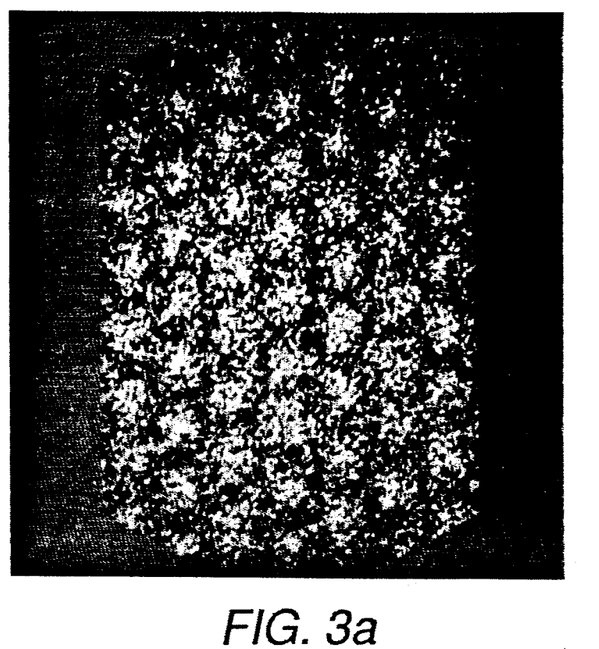
FIG. 3a is a flood image of a spatially constant source having "tube" or hex pattern artifacts along with random noise.
Figure 3B:
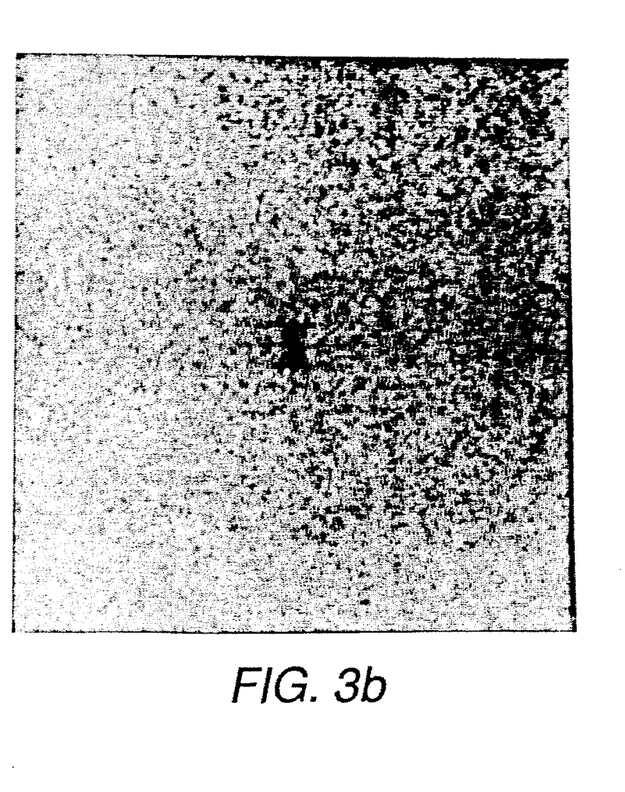
Figure 4A:
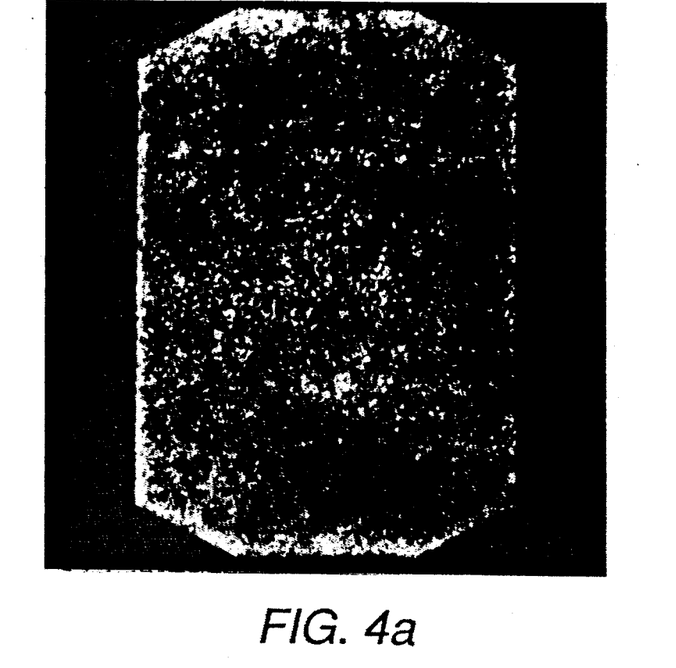
FIG. 4a is a flood image of a spatially constant source having secondary tube pattern artifacts along with random noise.
Figure 4B:
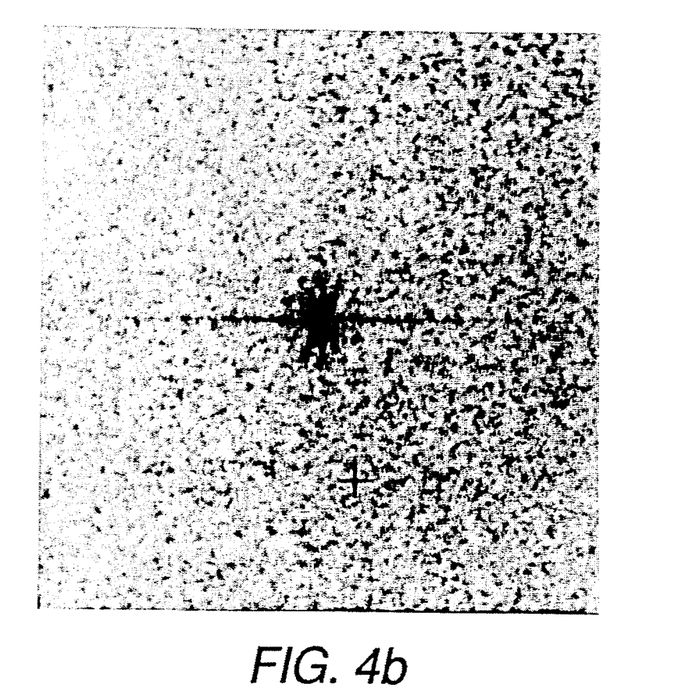
Figure 9A:
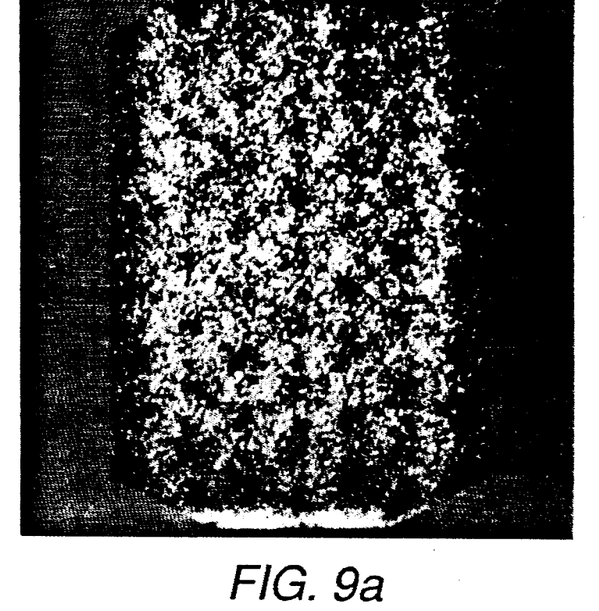
FIG. 9a is a flood image of a spatially constant source having both tube pattern and tramline artifacts along with random noise.
Figure 9B:
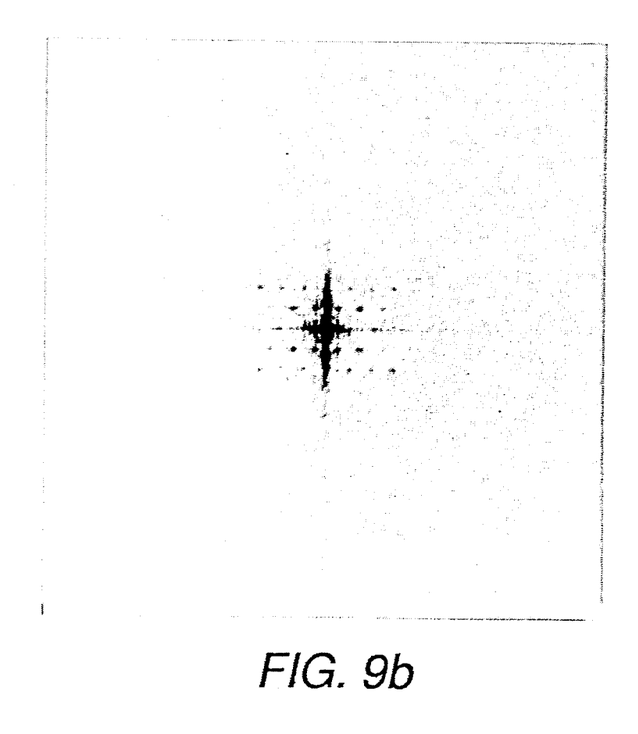

FIG. 2a shows a flood image having no artifacts except for random noise. FIGS. 3a, 4a, 5a, 6a, 7a, 8a show flood images having artifacts being: tube or hex pattern, secondary tube pattern, tramline (relatively brighter substantially parallel streaks), non-functional tube pattern (a darker or brighter patch), bright edge and general blotchiness, respectively. FIG. 9a has both tube pattern and tramline artifacts. Noise is also inherent in all these flood images.

Background Masking

If the flood images have a border with pixels of constant value significantly different from the remainder of the image, the results would be influenced more by the difference between any pixel value of the image and the border values. The transform field of an unnormalized image is influenced more by the shape of the image than its content. Therefore, in order to key in on the differences within the image, and not the differences between the image and the border, the pixel values within the image must be normalized to have an average value equal to the constant border value.

Figure 10:
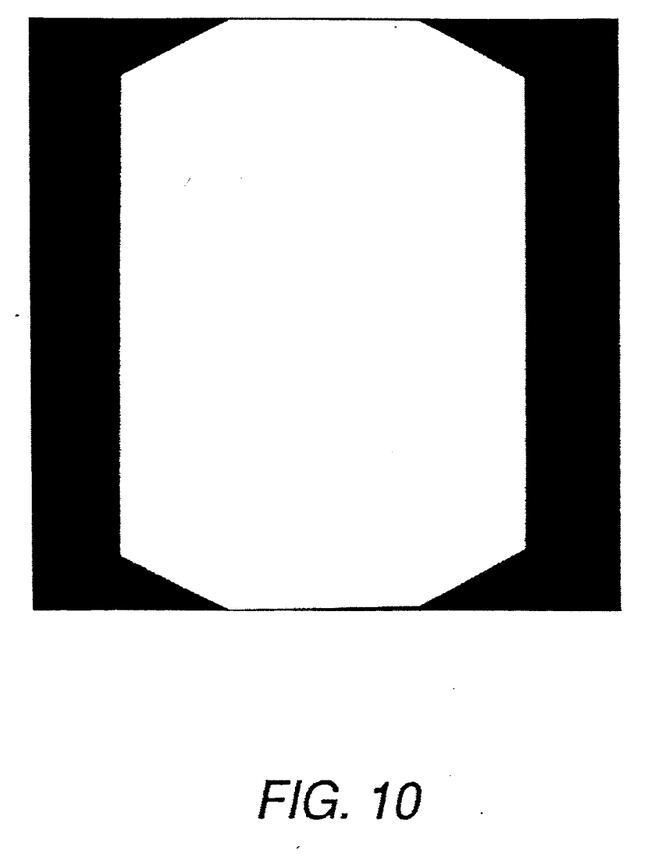
FIG. 10 is an region of interest (ROI) mask intended for deleting the background region outside of the region of interest of a Gamma camera.

Background masking causes the transform field to contain information pertaining to the image inside the region of interest (ROI) instead of being dominated by the background region. Since the ROI of the image does not cover an entire flood image $A^{(0)}$, it is necessary to set the background values outside of the ROI to zero intensity creating a masked flood image $A^{(1)}$. FIG. 10 shows an ROI mask R having elements $R_{i,j}$ with crosshatched regions Pertaining to a test mask element $R_{i,j}$ value of "0" and white regions pertaining to a test mask element $R_{i,j}$ value of "1", $$R_{i,j} = \begin{cases} 1; & \text{for } i,j \text{ within the } ROI \\ 0; & \text{for } i,j \text{ outside of the } ROI. \end{cases} \quad [1]$$

ROI mask R is specific to the field of view of imaging device. Other imaging devices take different shaped images, and hence require different ROI masks.

Image intensity normalization:

Masked flood image $A^{(1)}$ is normalized to create a normalized flood image A having normalized pixel intensity values $A_{i,j}$ inside the ROI with an average pixel intensity value $\mu$ of 0. This is done by computing the average pixel intensity value $\mu$ of all pixel intensity values $A^{(1)}_{i,j}$ of masked flood image $A^{(1)}$ inside the ROI and subtracting $\mu$ from all pixel intensity values of masked flood image $A^{(1)}$.

$$A_{i,j} = \begin{cases} A^{(1)}_{i,j} - \mu; & \text{for } i,j \text{ within the } ROI \\ 0; & \text{for } i,j \text{ outside of the } ROI \end{cases} \quad [2]$$

where A has N X N pixels intensity values $A_{i,j}$ at locations i,j, and $\mu$ is the average intensity value over flood image $A^{(1)}$, also referred to as "exposure".

Computation of the Unitary Transform

A unitary transform is performed on the normalized flood image A having N×N elements. This results in real or complex transformation components $T(A)_{i,j}$ each being an i,jth component of the unitary transform. The squared magnitude $|T(A)_{i,j}|^2$ of the complex conjugate pair is defined as:

$$|T(A)_{i,j}|^2 = t_{i,j} * t^*_{i,j} \quad [3]$$

where $t^*_{i,j}$ is the complex conjugate of $t_{i,j}$. The unitary transform may be a Fourier, Discrete Cosine, Hadamard, Discrete Sine, Haar or Slant Transform as described on pages 132–188 of "Fundamentals of Digital Image Processing" by Anil K. Jain, Prentice-Hall, (1989). As described in Jain, the above-mentioned transforms are unitary if the correct scaling factor is used. If another scaling factor is used, then the transforms are no longer unitary in a strict sense, although their essential properties are unchanged. The term "unitary transformation" is used here to mean any unitary transform possibly multiplied by a scaling factor. Throughout the remainder of this description, a Fourier transform is described, but any of the above-mentioned transforms may be used in its place. In the case of the Fourier transform, the component $T(A)_{i,j}$ is the (i,j)th frequency component of the transform.

FIGS. 2b, 3b, 4b, 5b, 6b, 7b, 8b, and 9b show the Fourier transform fields of the flood images, FIGS. 2a, 3a, 4a, 5a, 6a, 7a, 8a and 9a, respectively. The horizontal and vertical dimensions of the transform fields being the $f_x$ and $f_y$ frequency axes pertain to the vertical x and horizontal y directions of the flood images, respectively. It can be seen that different types of artifacts present themselves in different regions of the transform field.

The transform field $T(A)_{i,j}$ is defined for i,j in the range $[-N/2, N/2-1]$, where $N \times N$ is the size of the flood image. Thus, the origin, or the $i=0, j=0$ transform value is at the center of the transform field for the Fourier, Haar, and Hadamard transforms. (The DCT transform is defined for the first quadrant only.)

Analysis of the transform field

The transform field $T(A)$ may be used by a human observer to aid in the diagnosis of image quality. However, for greatest benefit, a method of automatic analysis of the transform field is needed to reduce subjectivity.

Different artifacts appear in different regions of the transform field. Therefore the the total power in a specified region of transform field $T(A)$ is indicative of the presence of an artifact and may be compared with a specified threshold. If the power exceeds the specified threshold, then the flood image is deemed to have the artifact present and at a sufficient level. Various regions of transform field $T(A)$ are tested to determine the presence of various artifacts by masking out all portions of the transform field except those that are to be tested with a test mask.

The following notation will be adhered to throughout the remainder of the specification:

$\sigma^2$ is the variance of the image over the region of interest, $\sigma$ is the standard deviation;

M is a test mask having elements $M_{i,j}$ equal to 1 or 0;

$$S(A,M) = \sum_{i=0}^{N-1} \sum_{j=0}^{N-1} |T(A)_{i,j}|^2 M_{i,j} \quad [4]$$

is the transformation sum of the absolute values of transform values $T(A)_{i,j}$ of A over a test region;

$v(A,M)$ is a normalization factor depending on the flood image tested which will be described later.

Figure 11:
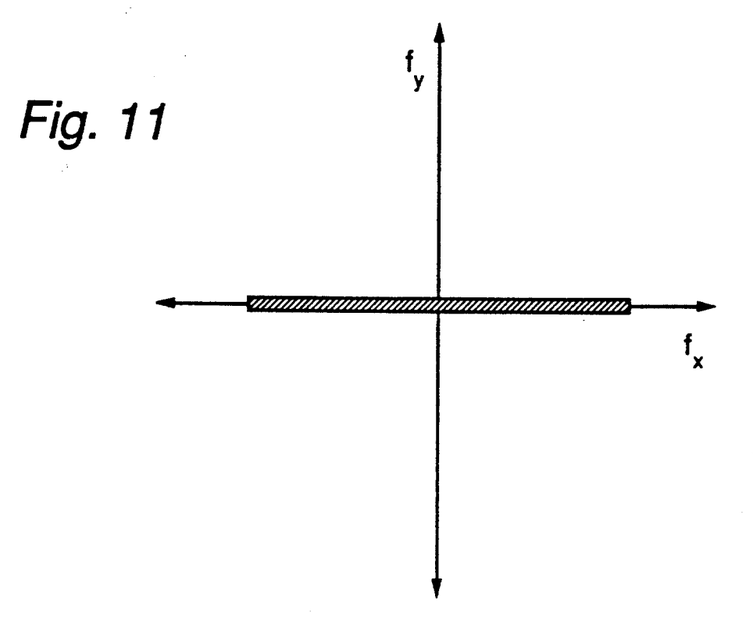
FIG. 11 is a test mask intended for testing for vertical tramline artifacts.

Tests involving a Mask:

Tests involve masking the transformation field with a mask. As an example, FIG. 11 shows a test mask called "maskh5". It consists of a horizontal strip 5 pixels wide across the center of the image, except for a region near the center of the image. The mask elements corresponding to a value "1" are shown as the cross-hatched region and represent the region over which the transform field $T(A)$ is to be tested. Each mask is designed to test for a specific type of artifact, or several specific types of artifacts. In particular, for a test mask M and a transform field $T(A)$, the transformation sum $S(A,M)$ is computed to calculate the power of the region tested. The calculated transformation sum $S(A,M)$ is then multiplied by a normalization factor $v(A,M)$.

The normalized transformation sum is then compared to a predetermined threshold value $V(M)$. Thus if $$v(A,M)S(A,M) > V(M) \quad [5]$$

then the image is deemed to contain a significant artifact that is being tested for by test mask M. Appropriate action is then taken based upon the test results. This may be rejection of the imaging device during manufacturing, or automated adjustment in a lab environment. A variety of methods indicating the results of the test may be used, such as messages printed across a monitor, flashing lights etc.

Figure 5A:
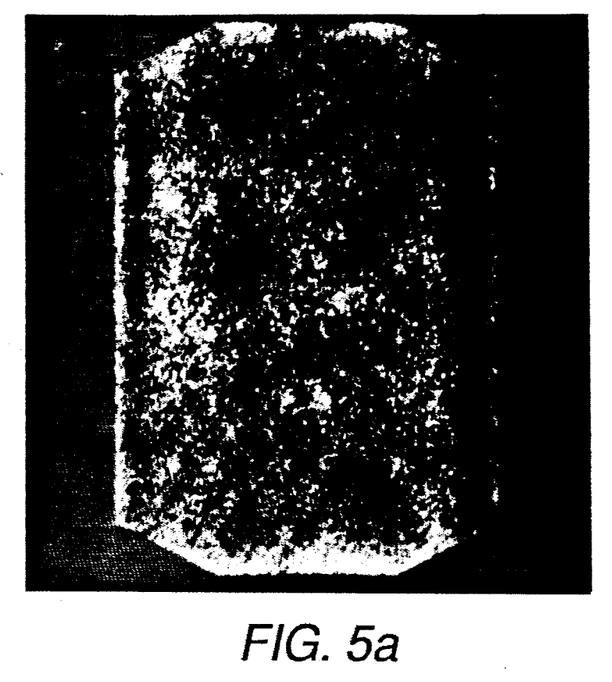
FIG. 5a is a flood image of a spatially constant source having tramline artifacts along with random noise.
Figure 5B:
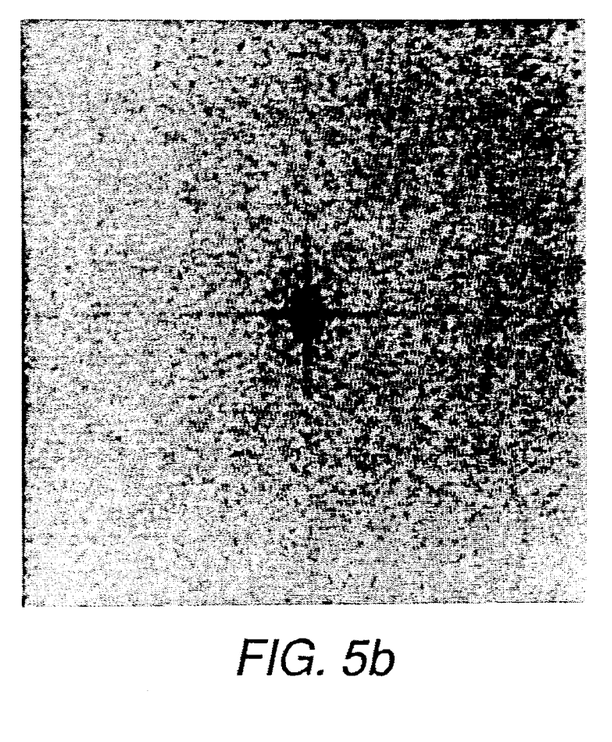
Figure 6A:
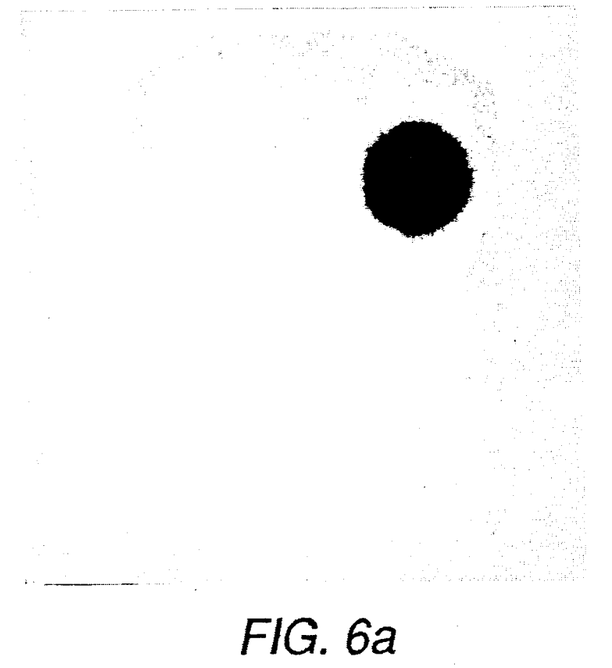
FIG. 6a is a flood image of a spatially constant source having non-functional tube pattern artifacts along with random noise.
Figure 6B:
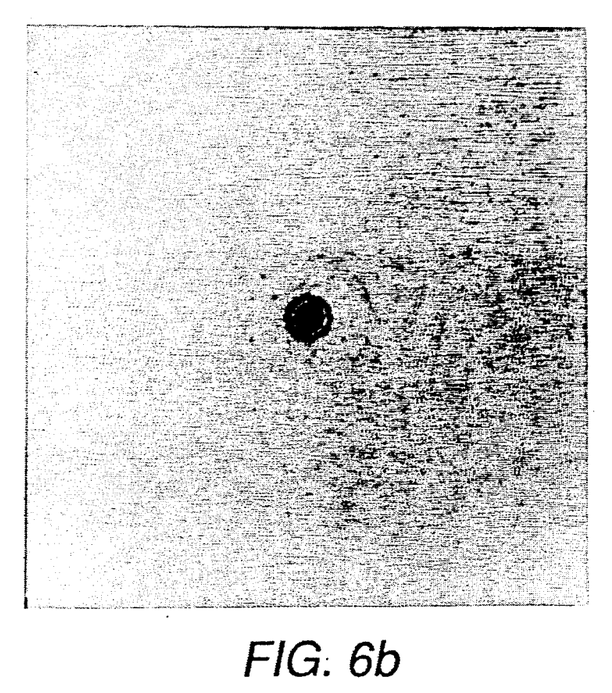
Figure 7A:
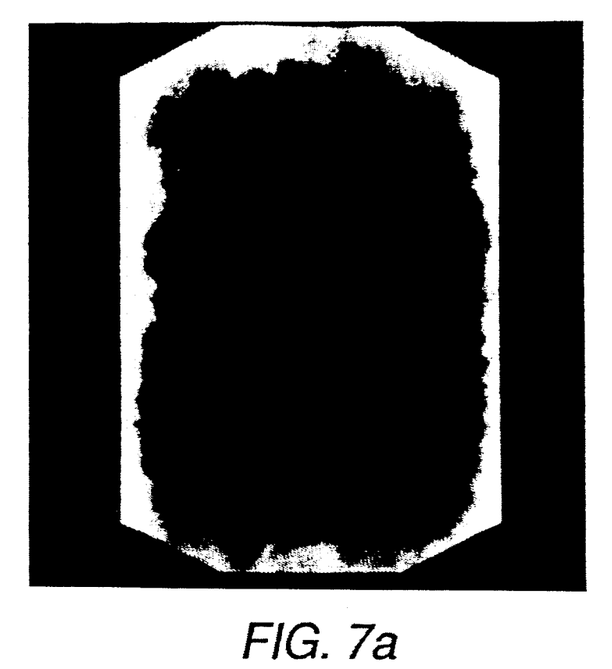
FIG. 7a is a flood image of a spatially constant source having bright edge artifacts along with random noise.
Figure 7B:
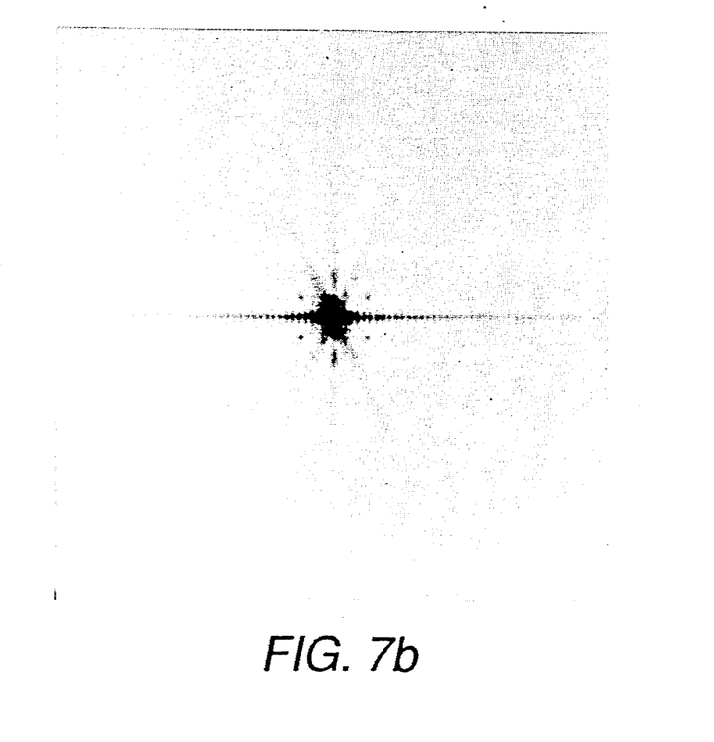
Figure 8A:
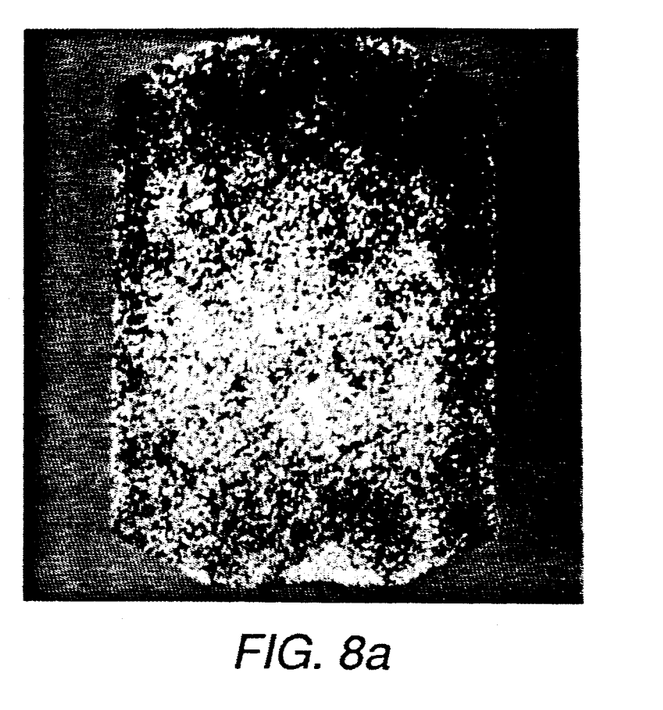
FIG. 8a is a flood image of a spatially constant source having general blotchiness artifacts along with random noise.
Figure 8B:
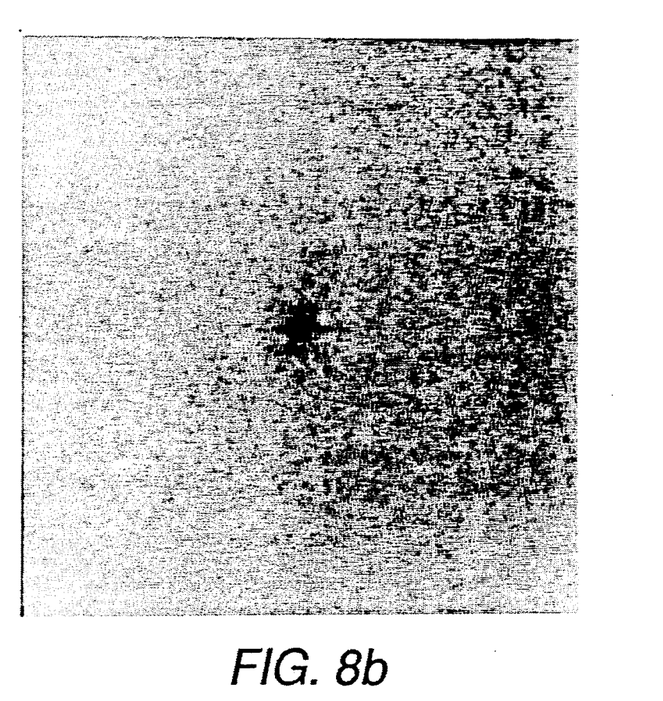

For instance, FIG. 5a shows the image containing tramlines. FIG. 5b shows the transform field $T(A)$ of FIG. 5a having brighter regions (larger transform values) vertically and horizontally through the center of the transform field. A test mask "maskh5" shown in FIG. 11, which tests for the occurrences of tramline artifacts, selects the vertical strip of the transform field as a test region. If $$v(A,M)S(A,M) > V(M) \quad [6]$$

then the message such as "Vertical tram lines ? (narrow)" is displayed indicating the existence of tram lines in the image.

Figure 12:
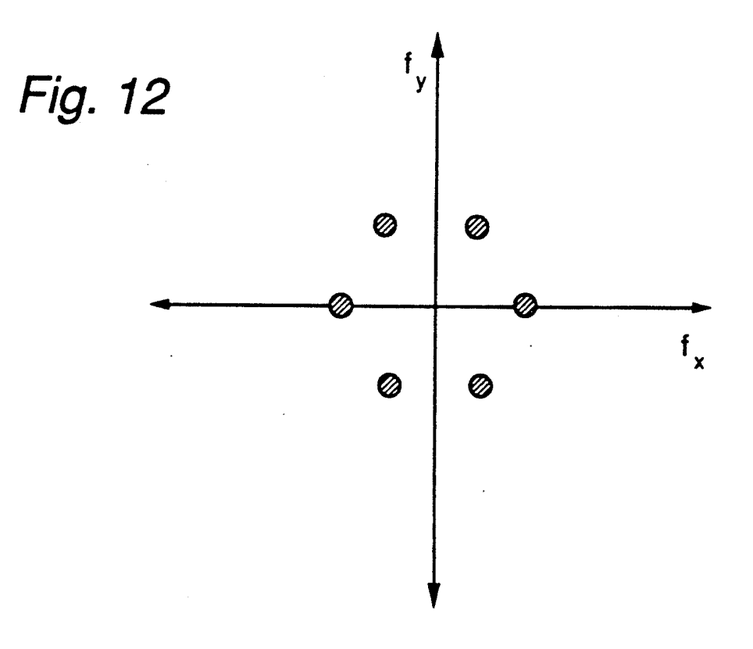
FIGS. 12 is a test mask intended for testing for hex pattern artifacts.

FIG. 12 shows a test mask for testing for hexagonal pattern artifacts. It consists of circular regions evenly dispersed about the $f_x, f_y = 0$ or the D.C. term. The mask elements corresponding to a value "1" are shown as the cross-hatched region and represent the regions over which the transform field $T(A)$ is to be tested.

Figure 13:
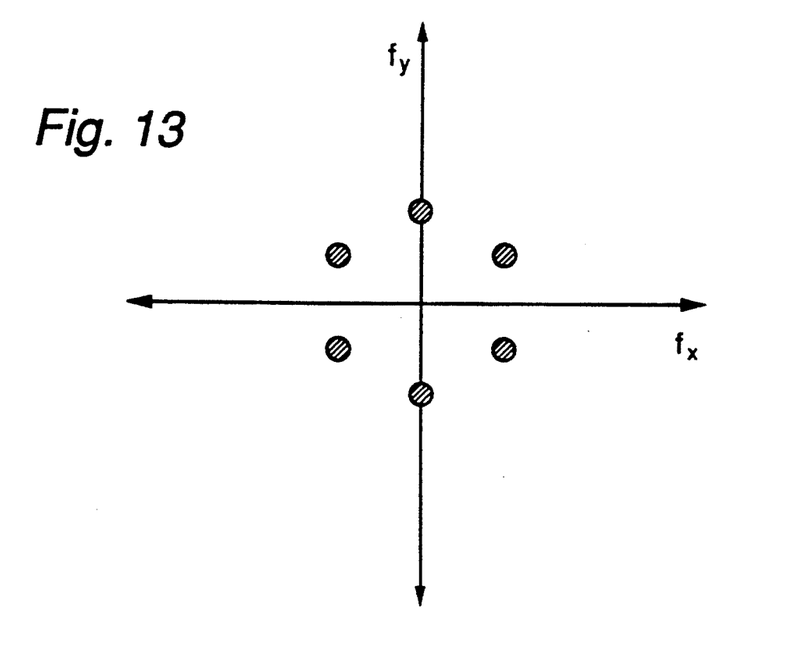
FIG. 13 is a test mask intended for testing for secondary hex pattern artifacts.

FIG. 13 shows a test mask for testing for secondary hexagonal pattern artifacts. It consists of circular regions evenly dispersed about the D.C. term. The mask elements corresponding to a value "1" are shown as the cross-hatched region and represent the regions over which the transform field $T(A)$ is to be tested.

Figure 14:
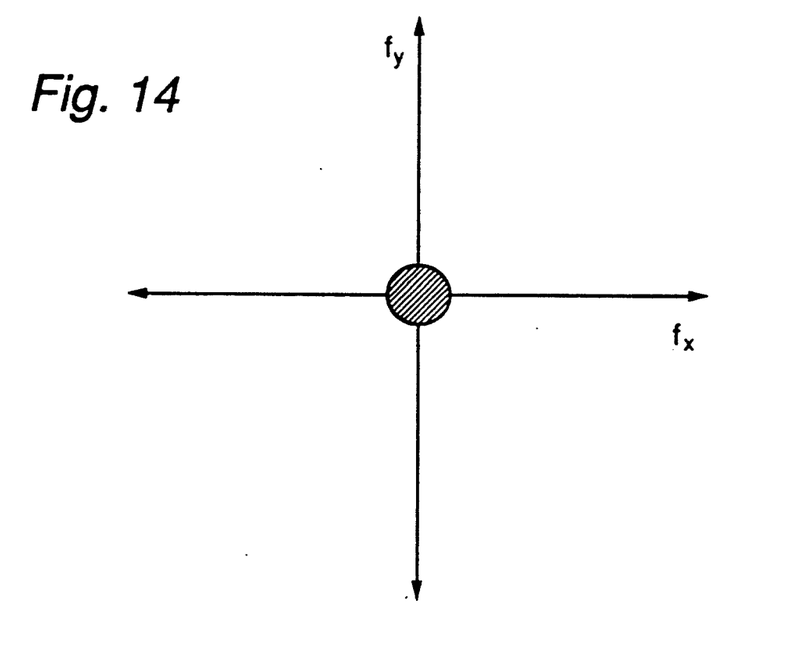
FIG. 14 is a test mask intended for testing for non-functional or faulty tube artifacts.

FIG. 14 illustrates a test mask which may be used in identifying non-functional tube patterns.

Normalization by mean pixel value:

In order for the images to be compared against specified thresholds, the summed transform values must be normalized to be independent of the exposure $\mu$ of the image. If this is done, then the transformation threshold values will be valid for all image exposures.

The power of a signal increases as the square of the exposure, $\mu^2$. Consequently, the value of $S(A, M)$ increases proportional to $\mu^2$.

Therefore, in order to correct for exposure, the normalization factor $v(A,M)$ is:

$$v(A,M) = \frac{1}{\mu^2} \quad [7]$$

Hence, the normalized transformation sum $\bar{S}(A,M)$ is defined as follows:

$$\bar{S}(A,M) = v(A,M)S(A,M) = S(A,M)/\mu^2 \quad [8]$$

Selection of Threshold Values:

An image is deemed to fail if its normalized transform value with respect to a single or double mask tests exceeds a predetermined threshold value. The image passes only if it passes all the tests.

The selection of appropriate threshold values to determine image quality may be done empirically. A representative sample of images are examined by human observers and classified as good or bad. The normalized transform values of the images with respect to a set of masks are then computed.

Thresholds are then chosen by hand or automatically in such a way that the pass/fail status of the image with respect to all tests agrees most closely with the classification of the human observer. This may be done (for instance) by choosing threshold values in such a way that all images rated as failing by a human observer are are deemed to fail by the threshold comparison test while as few good images as possible fail the test. This strategy may be termed a "no false positives—minimum false negative" strategy. The choice of thresholds is then a combination optimization problem, and may be solved by optimization techniques such as simulated annealing. The method of simulated annealing is described on pp. 1-20 of "The Annealing Algorithm" by R. H. J. M. Otten and L. P. P. P. van Ginneken, published by Kluwer Academic Publishers, Boston, 1989.

Another possible threshold selection strategy is "no false negatives—minimum false positive" strategy being the converse of the "no false positives—minimum false negative" strategy. The threshold values are chosen in such a way that all images rated as passing by a human observer are are deemed to pass by the threshold comparison while as few bad images as possible pass the threshold test.

Figure 15:
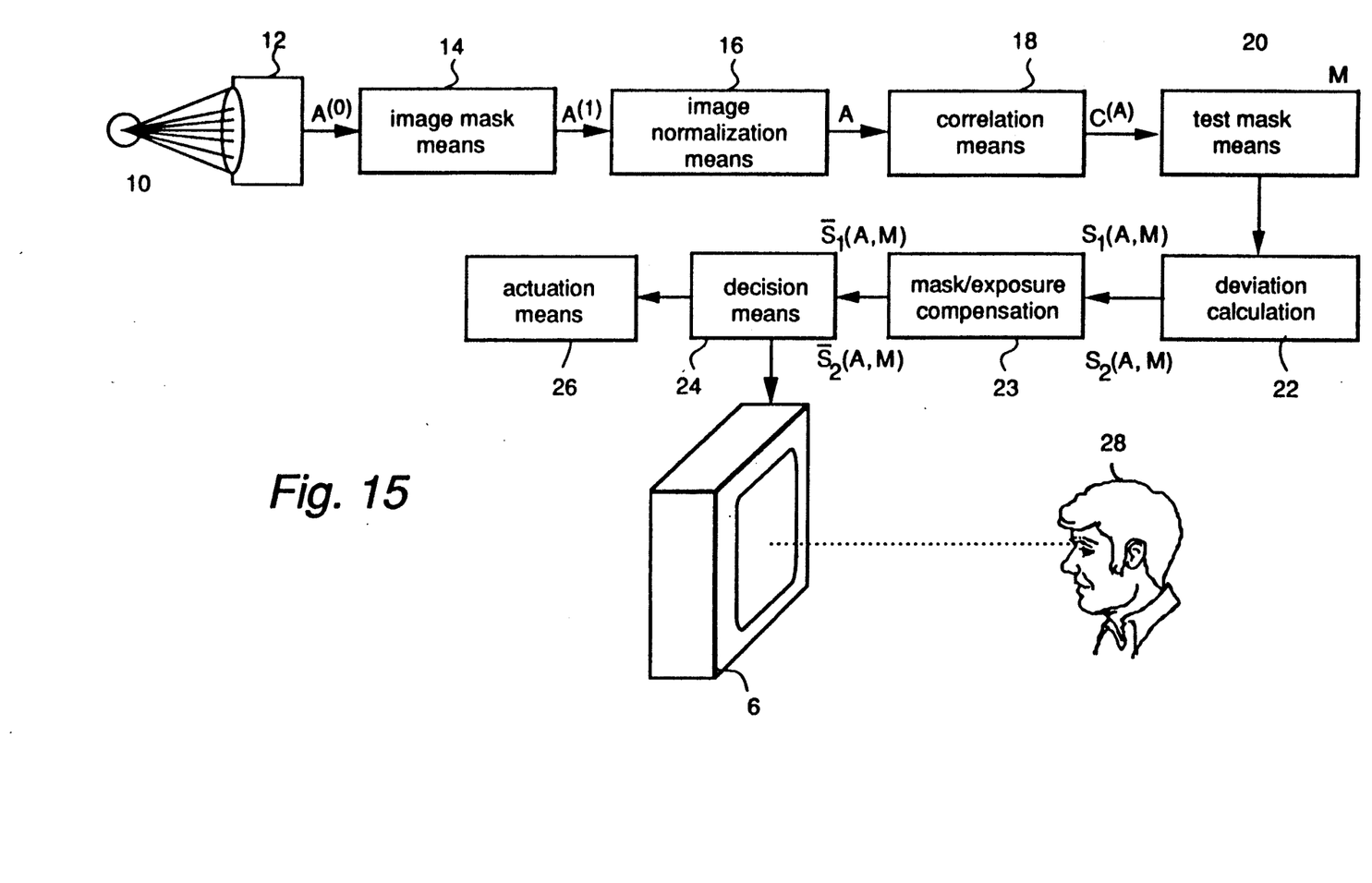
FIG. 15 is a simplified block diagram of an automated system for identifying defects in an imaging device according to the present invention.

FIG. 15 is a simplified block diagram of a system for identifying defects in an imaging device according to the present invention. A uniform source 10 provides radiation of spatially uniform intensity to an imaging device 12 allowing the imaging device to create a D-dimensional flood image $A^{(0)}$ comprised of a Plurality of intensity values over a region of interest (ROI) and background region.

Flood image $A^{(0)}$ is passed to an ROI mask unit 14 adapted for setting values of the background region to zero and passing the remaining intensity values within ROI, being a flood image $A^{(1)}$, unchanged to an image normalization unit 16. Image normalization unit 16 calculates a mean intensity $\mu$ over the ROI and subtracts mean intensity $\mu$ from each intensity value within the ROI, resulting in a normalized intensity value of normalized flood image A having a mean intensity being zero over the ROI.

A unitary transform unit 18 coupled to the ROI mask unit 14 receives the normalized intensity values A and determines a D-dimensional transform field T(A). A test mask 20 selects regions of the transform field to be tested according to a test mask M and passes the selected regions of transform field T(A) to a deviation calculation means 22 which determines a sum of transformation sum S(A,M) within the selected regions. A mask/exposure compensation means 23 receives transformation sum S(A,M) and determines a universal transformation sum $\bar{S}$(A,M) normalized for the test mask M employed and the exposure $\mu$ of the original flood image $A^{(0)}$.

A decision unit 24 coupled to mask/exposure compensation means 23 compares normalized transformation sum $\bar{S}$(A,M) to a predetermined maximum threshold values V(M) and determines if the threshold has been exceeded. If it has been exceeded, decision unit 24 may take an appropriate action such as activating an actuator 26 to operate an output means 28 or displaying a message on a display means 24.

In alterative embodiments, the actuator means 26 may physically remove an imaging means that fails the tests from an assembly line, print and attach a tag indicating that the imaging device has failed the test, or iteratively adjust equipment in the imaging means to reduce the artifact and repeat the test.

Therefore, a summary of a method consistent with the present invention are the steps of:

1. selecting an imaging device to be tested;
2. creating a region of interest (ROI) mask R for the selected imaging device;
3. selecting types of artifacts to be detected;
4. creating a test mask M for each type of artifact;
5. creating a flood image $A^{(0)}$ with the selected imaging device to be tested having a plurality of intensity values each corresponding to a pixel of the flood image;
6. masking out regions of the flood image $A^{(0)}$ with ROI mask R to select the ROI and produce a flood image $A^{(1)}$;
7. determining an average exposure $\mu$ over the ROI of flood image $A^{(l)}$;
8. normalizing flood image $A^{(1)}$ by subtracting $\mu$ from each pixel value to produce normalized flood image A;
9. performing a unitary transformation of normalized flood image A to provide a plurality of transform values comprising a transform field T(A);
10. masking out regions of transform field T(A) with the test mask M to result in tested regions of the transform field;
11. determining a transformation sum S(A,M) within the tested regions of the transform field;
12. normalizing the transformation sum S(A,M) in the test regions relative to average exposure $\mu$ to arrive at a normalized transformation sum $\bar{S}$(A,M);
13. comparing the normalized transformation sum $\bar{S}$(A,M) to a predetermined threshold; and
14. taking an appropriate action when the thresholds has been exceeded indicating that an artifact of the type being tested for is present in the image of the imaging device to a degree greater than an acceptable level; and
15. repeating steps "15"-"14" for all artifact types to be tested.

The ROI mask is constructed to pass pixels which are within the field of view of the imaging device, and blocks all other regions of the flood image.

The test mask is constructed using a known artifact and examining the transform field pattern produced. This may be summarized for each test mask as:

1. creating a flood image $A^{(0)}$ having a known artifact type which is desired to be tested for in other flood images;
2. masking out regions of flood image $A^{(0)}$ with the ROI mask to select the ROI and produce a flood image $A^{(1)}$;
3. determining an average exposure $\mu$ over flood image $A^{(1)}$;
4. normalizing flood image $A^{(1)}$ by subtracting exposure $\mu$ from each pixel value to produce a flood image A;
5. performing a unitary transformation of flood image A to provide a plurality of transform values $T(A)_{i,j}$ comprising a transform field T(A);

6. determining characteristic regions of the transform field; and
7. creating a test mask which selects the characteristic regions and blocks other regions of the transform field.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What is claimed is:

1. An automated system for identifying defects in an imaging device comprising:
   a) a radiation source for providing radiation of spatially uniform intensity to said imaging device to allow said device to create a D-dimensional image $A^{(0)}$ comprised of a plurality of intensity values over a region of interest (ROI) and background region;
   b) a region of interest (ROI) mask unit for employing a mask R setting values of the background region to zero producing a flood image $A^{(1)}$;
   c) image normalization unit for calculating a mean intensity $\mu$ over flood image $A^{(1)}$ and subtracting the mean intensity $\mu$ from each intensity value of flood image $A^{(1)}$ so as to result in a normalized flood image A having intensity values with a mean intensity $\mu$ of zero over the ROI;
   d) a unitary transform unit for receiving the normalized intensity values of normalized flood image A and determining a D-dimensional transform field T(A) comprised of a plurality of transform values $T(A)_{i,j}$;
   e) test mask unit for employing a test mask M that blocks out non-desired regions of the transform field and selects desired regions of the transform field;
   f) deviation calculation means for determining a transformation sum S(A,M) being a sum of the squares of the transform values of the selected regions of transform field T(A);
   g) decision unit adapted for comparing the transformation sum S(A,M) produced by the deviation calculation means to a predetermined maximum threshold, and for testing if threshold has been exceeded; and
   h) display means for indicating if the threshold has been exceeded.

2. The automated system for identifying defects in an imaging device as recited in claim 1 further comprising an actuator for receiving from the decision unit the test result and actuating an automated system accordingly when the predetermined threshold value has been exceeded.

3. The automated system for identifying defects in an imaging device as recited in claim 2 wherein the decision unit is adapted to perform a plurality of subtests by comparing each transformation sum S(A,M) produced by the deviation calculation means to a predetermined maximum threshold value to determine a subtest result, and to combine the subtest results into a final test result.

4. The automated system for identifying defects in an imaging device as recited in claim 1 and further comprising a mask/exposure compensation means for receiving and adjusting each transformation sum S(A,M) to compensate for the mean intensity $\mu$ of the original flood image $A^{(0)}$ according to:

$$\overline{S}(A,M) = \frac{S(A,M)}{\mu^2}.$$

5. An automated method of testing an imaging device for artifacts comprising the steps of:
   a) creating a region of interest (ROI) mask R which corresponds to a field of view of said imaging device;
   b) selecting types of artifacts to be detected;
   c) creating a test mask M for each type of artifact;
   d) creating a flood image $A^{(0)}$ with the selected imaging device to be tested having a plurality of intensity values each of said values corresponding to respective a pixel of the flood image $A^{(0)}$;
   e) masking out regions of the flood image $A^{(0)}$ with ROI mask R to select the ROI to produce a flood image $A^{(1)}$;
   f) determining an average exposure $\mu$ over the ROI of flood image $A^{(1)}$;
   g) normalizing flood image $A^{(1)}$ by subtracting $\mu$ from each intensity value of flood image $A^{(1)}$ to arrive at a normalized flood image A;
   h) performing a unitary transformation of flood image A to provide a plurality of transform values $T(A)_{i,j}$ comprising a transform field T(A);
   i) masking out regions of the transform field T(A) with the test mask M to leave remaining only tested regions of the transform field;
   j) summing squared magnitudes of transform values $T(A)_{i,j}$ over the tested region to result in a transformation sum S(A,M);
   k) normalizing transformation sum S(A,M) according to average exposure $\mu$ to arrive at a normalized transformation sum $\overline{S}(A,M)$;
   l) comparing the normalized transformation sum and normalized transformation squared sum $\overline{S}(A,M)$ against a predetermined threshold;
   m) taking a corrective action when the thresholds has been exceeded indicating that an artifact of the type being tested for is present in the image of the imaging device to a degree greater than is acceptable; and
   n) repeating steps "d"–"m" for all artifact types to be detected.

6. The automated method of testing an imaging device as recited in claim 5 wherein the step of creating a test mask comprises the steps of:
   a) creating a flood image $A^{(0)}$ having a known artifact type which is desired to be tested for in flood images;
   b) masking out regions of the flood image $A^{(0)}$ with the ROI mask to select the ROI and produce a flood image $A^{(1)}$;
   c) determining an average exposure $\mu$ of the flood image $A^{(1)}$ over the ROI;
   d) normalizing flood image $A^{(1)}$ by subtracting average exposure $\mu$ from each intensity value of flood image $A^{(1)}$ to arrive at a normalized flood image A;
   e) performing a unitary transformation of normalized flood image A to provide a plurality of transform values $T(A)_{i,j}$ comprising a transform field T(A);
   f) determining characteristic regions of the transform field T(A);
   g) creating a test mask M which selects the characteristic regions and blocks other regions of the transform field; and
   h) repeating steps "a"–"g" for each test mask M to be constructed.

7. The automated method of testing an imaging device as recited in claim 5 wherein the step of taking a corrective action when the threshold has been exceeded comprises the steps of:
   a) adjusting the imaging device;
   b) retesting the imaging device for artifacts; and
   c) repeating steps "a"–"b" until a satisfactory artifact level is achieved or until the imaging device is rejected.

* * * * *